Patented Aug. 14, 1923.

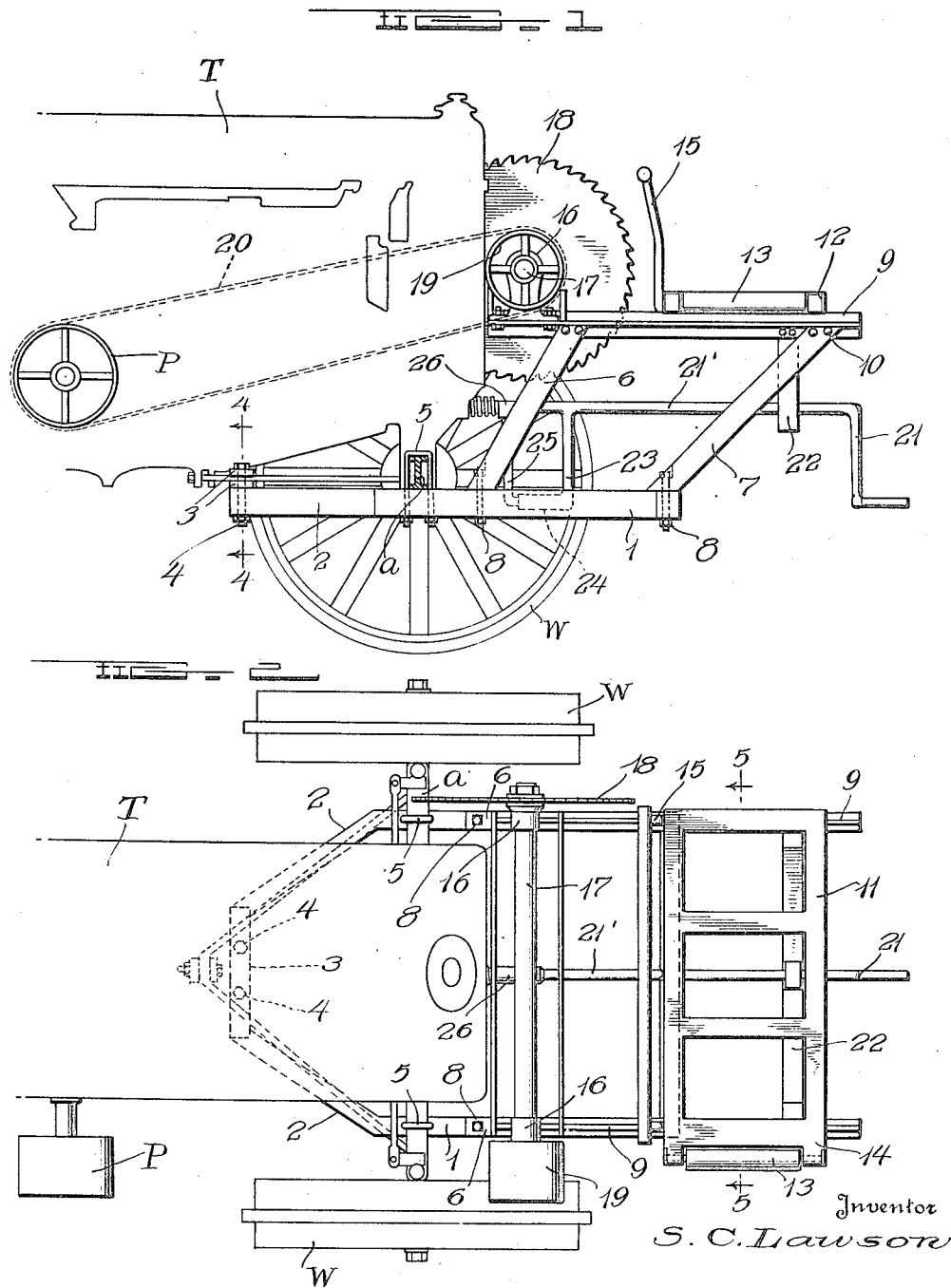

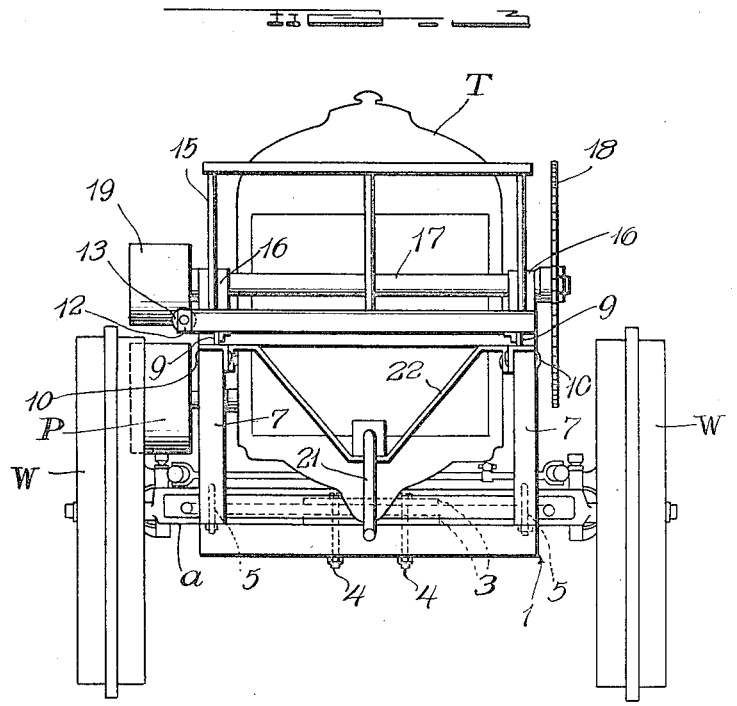
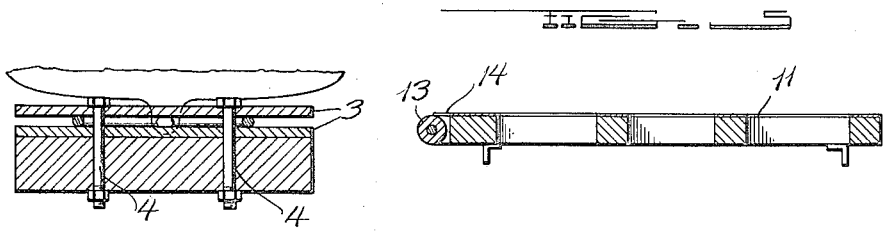
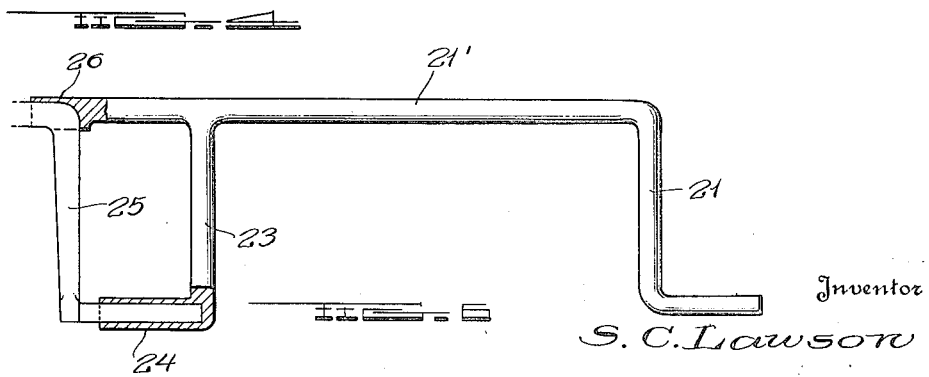

1,464,878

UNITED STATES PATENT OFFICE.

SIDNEY C. LAWSON, OF DEER LODGE, MONTANA.

TRACTOR SAW ATTACHMENT.

Application filed May 8, 1922. Serial No. 559,359.

*To all whom it may concern:*

Be it known that I, SIDNEY C. LAWSON, a citizen of the United States of America, residing at Deer Lodge, in the county of Powell and State of Montana, have invented certain new and useful Improvements in Tractor Saw Attachments; and I do hereby declare that the following is a full, clear, concise, and exact description of the invention, such as will enable others skilled in the art to which it appertains to make and use the same.

This invention relates to improvements in saw attachments for motor tractors, having for an object to provide a portable power operated saw support and table of such arrangement and construction as will permit the attaching of the same to the forward end of a motor tractor, whereby it can be conveniently moved from place to place as a part of the tractor.

It is likewise an object of the invention to provide the device with a substantial supporting frame which can be connected to the tractor in a manner to direct the load or stress applied thereto to the tractor frame, whereupon the same will be evenly diffused, thus avoiding alteration of the body and also materially lessening vibration of the same.

Yet another object of the invention is to provide the device with a novel extension adapted to be engaged with the engine starting crank handle in order that rotary motion may be conveniently transmitted to the same without interference from said supporting frame.

Other objects will be in part obvious and in part pointed out hereinafter.

In order that the invention and its mode of operation may be readily understood by persons skilled in the art, I have in the accompanying illustrative drawings, and in the detailed following description based thereon, set out one possible embodiment of the same.

In these drawings:

Figure 1 is a side elevation of the improved device showing it connected or attached to the forward end of a motor tractor, a portion of which is shown in section;

Figure 2 is a top plan view of the device showing it connected to the forward end of a motor tractor;

Figure 3 is a front elevation thereof;

Figure 4 is a detail in section taken on the line 4—4 of Figure 1 showing the manner in which the rearward end of the main frame is connected to the tractor;

Figure 5 is a vertical section taken on the line 5—5 of Figure 2 looking in the direction in which the arrows point; and, Figure 6 is a detail partly in section illustrating the crank handle extension.

Having more particular reference to the drawings, in connection with which like characters of reference will designate corresponding parts throughout, T generally indicates the tractor, being provided with forward or steering wheels $w$ and a forward axle $a$, which as shown in the Figure 1, is of the usual I-beam type. The tractor T is provided with the usual power transmitting pulley $p$, whereby power may be transmitted from the same to the rotary saw of the invention, hereinafter more fully described.

The invention may be stated to comprise a main frame 1, substantially rectangular in configuration and having the rearward portion thereof reduced or formed substantially V-shaped as indicated at 2 and clearly illustrated in the Figure 2. Clamping bars 3 are arranged upon the transverse piece of the V-shaped extension 2 and are adapted to be engaged with certain of the truss rods of the tractor frame as indicated in the Figure 1; bolts 4 passing therethrough and into engagement with the frame proper, as shown in the Figure 4, whereby to clampingly engage said bars 3 with the truss rods. The intermediate portion of the frame 1 is arranged below and adjacent the I-beam axle $a$ of the tractor and is securely connected thereto through the medium of U-shaped bolts 5, the lower portions of which are passed through the opposite sides of said frame and have suitable locking nuts turned into engagement with their screw threaded extremities for an obvious purpose. In this connection, it is to be noted that the forward or squared portion of the main frame 1 extends for a distance forwardly of the forward end of the tractor T and arranged upon this forwardly extending portion of the frame are diagonally disposed supporting arms 6 and 7, the same being secured at their lower ends to adjacent portions of the opposite sides of the main frame 1 through the medium of bolts or similar fastening devices 8.

Arranged above the forwardly extending portions of the main frame 1 is a secondary rectangular frame 9, preferably constructed of angle metal and being connected to the upper ends of the supporting arm 6 through the medium of rivets as indicated at 10. The uppermost or vertical webs of the opposite sides of the angle metal frame 9, afford longitudinally disposed tracks for the main frame 1 adapted to slidably receive and guide a work carriage 11 thereover, said work carriage, of course, being provided with brackets 12 upon its opposite extremities engageable over said vertical web portions. A roller 13 is rotatably mounted in the extended ends 14 of one side of the work carriage 11 and will afford means for facilitating the engagement of and arranging of logs or other lumber upon the carriage 11 in order that the same may be moved into engagement with the saw means, hereinafter described. Vertically disposed backs or rest bars 15 are secured to the inner side of the carriage 11 as clearly shown in the Figure 1, serving for an obvious purpose.

Disposed transversely of the rearward portion of the secondary frame 9 and mounted at its opposite ends in bearing brackets 16 secured to the opposite sides thereof, is a driven shaft 17 having a circular rotary saw 18 fixedly mounted upon one end thereof outwardly from the adjacent side of said secondary frame, while a pulley 19 is mounted upon the opposite laterally extending end thereof and, as will be understood, is adapted to be connected to the driving pulley of the tractor T through the medium of belt gearing 20, whereby rotary motion may be imparted to said shaft for operating the circular saw 18.

With a view towards providing means for permitting of the manual cranking or starting of the motor of the tractor T without interference from the main or secondary supporting frames of the device, I provide a secondary crank 21, forming the same with an elongated shank portion 21', a portion of which is rotatably mounted in a suitable hanger 22 secured to the intermediate portion of the under side of said secondary frame 9, while the other end of said elongated shank is provided with an angle arm 23 extending therefrom at substantially right angles as clearly shown in the Figure 4 and having a socket 24 formed in its free end adapted to be engaged over the handle of the motor crank 25, which, as will be understood, is arranged adjacent to and adapted to be connected to the power shaft of the tractor motor in the usual manner. The inner end of the elongated shank 21' is formed with a pocketed extension 26, which with engagement of the handle of the crank 25 in the socket 24 will engage the shank portion of said crank 25 in the manner indicated in the Figure 4. Thus, by turning the handle of the secondary crank 21, rotary motion may be imparted to the crank 25 and in turn transmitted to the tractor motor for starting the same. Because of the arrangement of the handle portion of the secondary frame 21 at a point adjacent the forward end of the secondary frame 9, it will be also understood that the tractor motor may be conveniently started without interference from either the main frame 1 or the secondary frame 9.

The mounting of the elongated shank portion 21 in the hanger 22 is such as will also permit of sliding movement of the secondary frame, whereby the toothed end of the motor crank 25 may be engaged with the power shaft in the usual way.

From the foregoing, it will be understood that in operation of the device, logs or lumber to be sawed will be placed upon the work carriage 11 slidable longitudinally of the secondary frame 9, whereupon said carriage will be moved rearwardly so as to bring the work into engagement with the rotating circular saw 18; rotary motion being transmitted to the saw 18 from the pulley $p$ through the belt gearing 20 to the pulley 19 mounted upon the opposite end of the driven shaft 17.

Due to the novel construction of the supporting frame of the device, this comprehending the main and secondary frames 1 and 9 respectively, it will be understood that the stability of the device will be materially enhanced. Furthermore, because of the specific mode of connection of the reduced or V-shaped end 2 of the main frame 1 with the chassis or frame of the tractor T, the load or stress applied to the secondary and main frames will be transmitted directly to such tractor frame and then diffused throughout the same. Thus, alteration of the body of the tractor as by way of attaching the device thereto, will be avoided, together with the material lessening of vibration of the tractor body, should the device be connected to it rather than to the attaching frame. Also, it should be noted that the arrangement of the device is such as will permit its adaption to practically any form of motor tractor without alteration to the same in any way. Likewise, with the device attached, the tractor may be used for hauling or other purposes without interference from the invention in any way whatsoever.

Manifestly, the construction shown is capable of considerable modification and such modification as is within the scope of my claims, I consider within the spirit of my invention.

I claim:

The combination with a tractor having truss rods and a front axle, of a portable power operated saw support and table comprising a substantially rectangular main frame suspended from the axle of the tractor, a substantially V-shaped extension formed with said main frame and extending rearwardly of the forward end of the tractor, means for detachably connecting the apex of said V-shaped extension to said truss rods, diagonally disposed supporting arms secured to the opposite sides of the forward portion of said main frame and extending in front of the tractor, a secondary frame comprising a pair of angle bars secured to the upper ends of said diagonally disposed supporting arms, said angle bars forming track ways, a rotary saw supported by said angle bars and arranged at the rearward portion of said secondary frame, and a carriage adapted to travel upon the tracks formed by said angle bars whereby the same moves upon said secondary frame towards and from said rotary saw.

In witness whereof I have hereunto set my hand.

SIDNEY C. LAWSON.